(12) United States Patent
Jang et al.

(10) Patent No.: US 10,082,989 B2
(45) Date of Patent: Sep. 25, 2018

(54) DEVICE AND METHOD FOR SIMULATING 3D PRINTING

(71) Applicant: ELECTRONICS AND TELECOMMUNICATIONS RESEARCH INSTITUTE, Daejeon (KR)

(72) Inventors: In-Su Jang, Daejeon (KR); Soon-Young Kwon, Daejeon (KR); Jin-Seo Kim, Daejeon (KR); Yoon-Seok Choi, Daejeon (KR)

(73) Assignee: ELECTRONICS AND TELECOMMUNICATIONS RESEARCH INSITUTE, Daejeon (KR)

( * ) Notice: Subject to any disclaimer, the term of this patent is extended or adjusted under 35 U.S.C. 154(b) by 525 days.

(21) Appl. No.: 14/821,032

(22) Filed: Aug. 7, 2015

(65) Prior Publication Data
US 2016/0274830 A1 Sep. 22, 2016

(30) Foreign Application Priority Data

Mar. 17, 2015 (KR) ........................ 10-2015-0036976

(51) Int. Cl.
G06T 19/00 (2011.01)
B33Y 50/00 (2015.01)
B29C 37/00 (2006.01)
G05B 15/00 (2006.01)
G06F 3/12 (2006.01)
G06K 15/02 (2006.01)

(52) U.S. Cl.
CPC .......... *G06F 3/1208* (2013.01); *G06F 3/1256* (2013.01); *G06F 3/1285* (2013.01); *G06K 15/025* (2013.01)

(58) Field of Classification Search
CPC ...... G06F 3/1208; G06F 3/1256; G06F 17/50; G06T 19/00; G06T 2200/08; G05B 19/4099; B33Y 50/00; B33Y 50/02; B29C 37/00; B29C 64/00
See application file for complete search history.

(56) References Cited

U.S. PATENT DOCUMENTS 6,652,256 B2 * 11/2003 Coe ..................... B29C 67/0059
264/401
8,605,327 B2 12/2013 Son et al.
(Continued)

FOREIGN PATENT DOCUMENTS

KR 10-2008-0082909 A 9/2008
KR 10-2013-0088718 A 8/2013

OTHER PUBLICATIONS

Solidworks Help; RealView Graphics, by Dassault Systems, printed from Internet on Jan. 21, 2018; Taken from SolidWorks version 2014; 3 pages.*
(Continued)

Primary Examiner — Ronald D Hartman, Jr.
(74) Attorney, Agent, or Firm — LRK Patent Law Firm

(57) ABSTRACT

The present invention relates to a device and a method for simulating 3D printing and more particularly, to a simulation technology which is able for a producer or a user to predict and correct a 3D model through previews shown when the 3D model displayed in a monitor is outputted by a 3D printer.

16 Claims, 6 Drawing Sheets

(56) References Cited

U.S. PATENT DOCUMENTS

| | | | |
|---|---|---|---|
| 8,902,220 B2* | 12/2014 | Rolleston | G06F 3/1208 |
| | | | 345/419 |
| 9,266,287 B2* | 2/2016 | Kautz | B29C 67/0088 |
| 9,747,394 B2* | 8/2017 | Nelaturi | G06F 17/5009 |
| 2012/0162202 A1* | 6/2012 | Rolleston | G06F 3/1208 |
| | | | 345/419 |
| 2013/0194292 A1 | 8/2013 | Cho et al. | |
| 2015/0098111 A1* | 4/2015 | Hoarau | G06F 3/1208 |
| | | | 358/1.15 |
| 2015/0134096 A1* | 5/2015 | Travers | B29C 67/0088 |
| | | | 700/98 |
| 2015/0165685 A1* | 6/2015 | Klappert | B29C 67/0088 |
| | | | 700/98 |
| 2015/0190970 A1* | 7/2015 | Itagaki | G06T 15/02 |
| | | | 700/98 |
| 2016/0185043 A1* | 6/2016 | Klappert | B29C 67/0088 |
| | | | 264/40.1 |
| 2016/0271881 A1* | 9/2016 | Bostick | B29C 67/0088 |

OTHER PUBLICATIONS

How to export full Assembly to STL, by Ali Mahvan; published on Jun. 12, 2012; 6 pages.*

Kaida Xiao et al., "Developing a 3D Colour Reproduction System for Additive Manufacturing of Facial Prostheses", 21st Color and Imaging Conference Final Program and Proceedings, pp. 206-209, Nov. 4, 2013.

In-Su Jang et al., "Adaptive Color Correction Method to Monitor in Color Laser Printer", Journal of the Institute of Electronics Engineers of Korea. SP 1229-6384, vol. 47 (4), pp. 63-68, Jul. 2010.

* cited by examiner

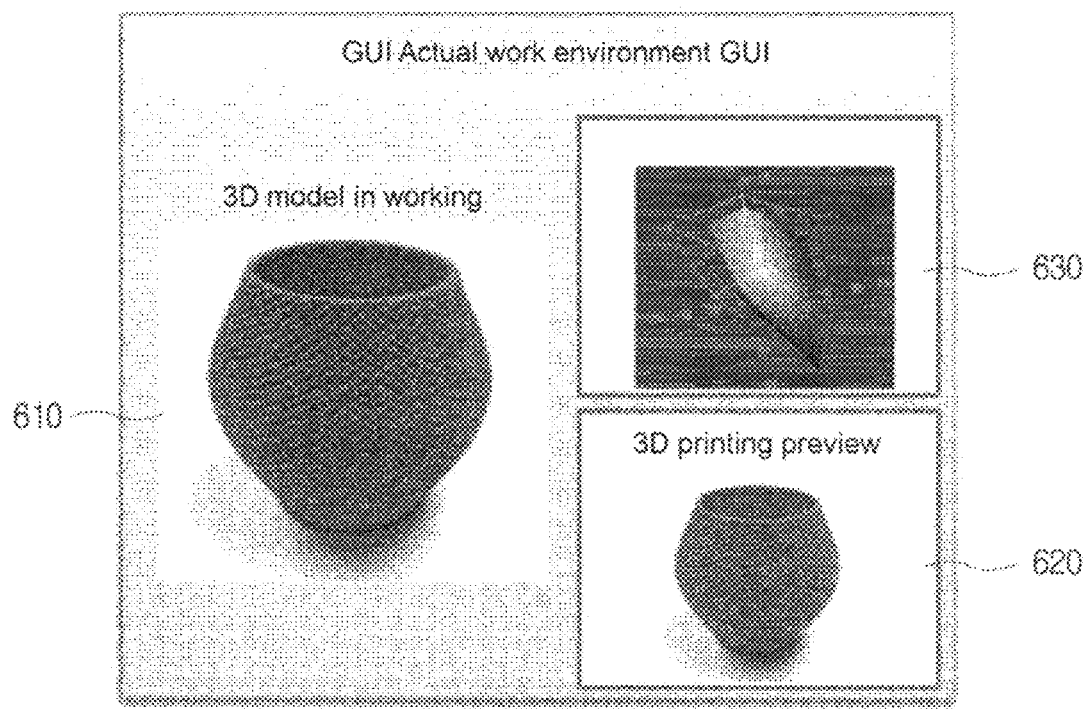

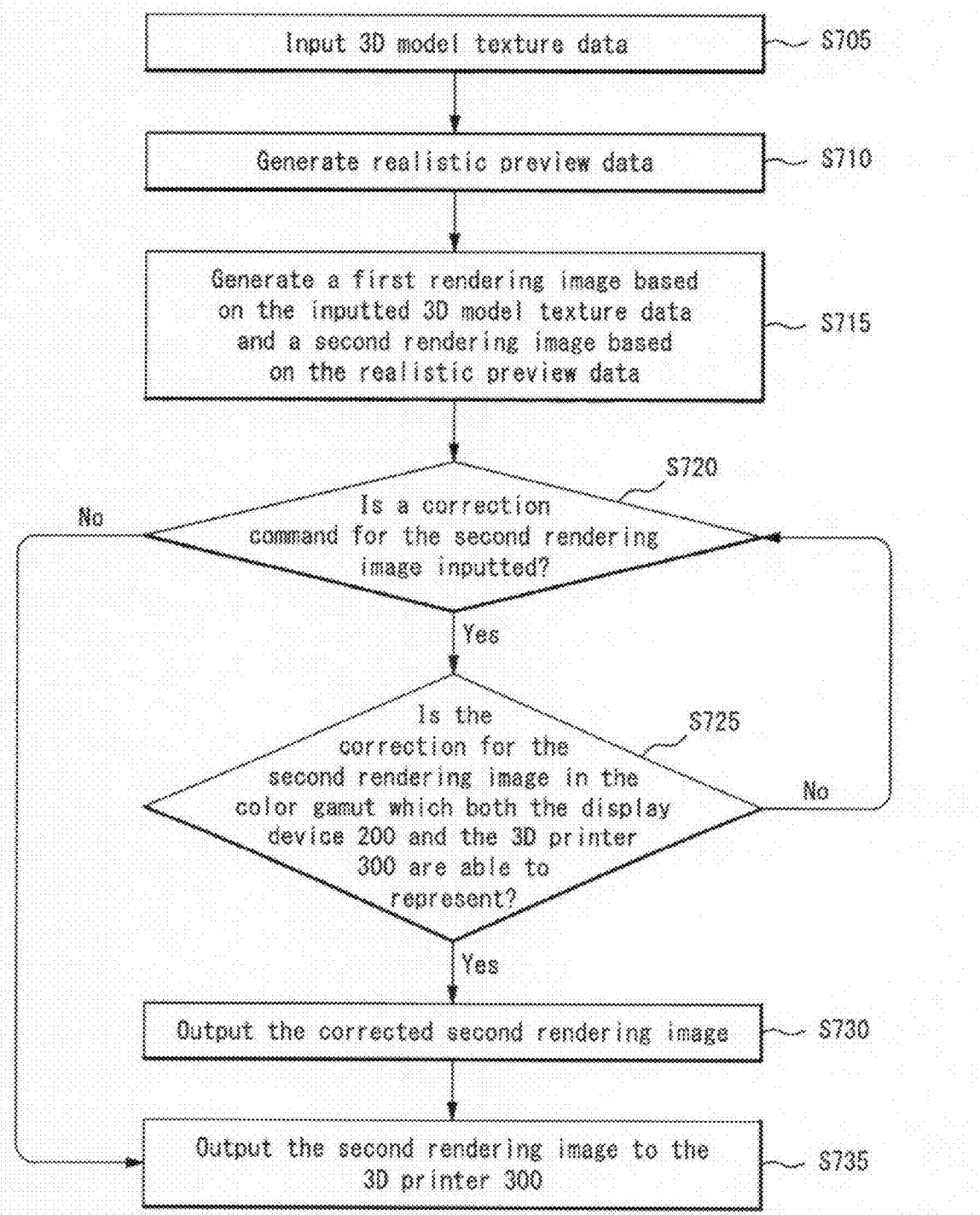

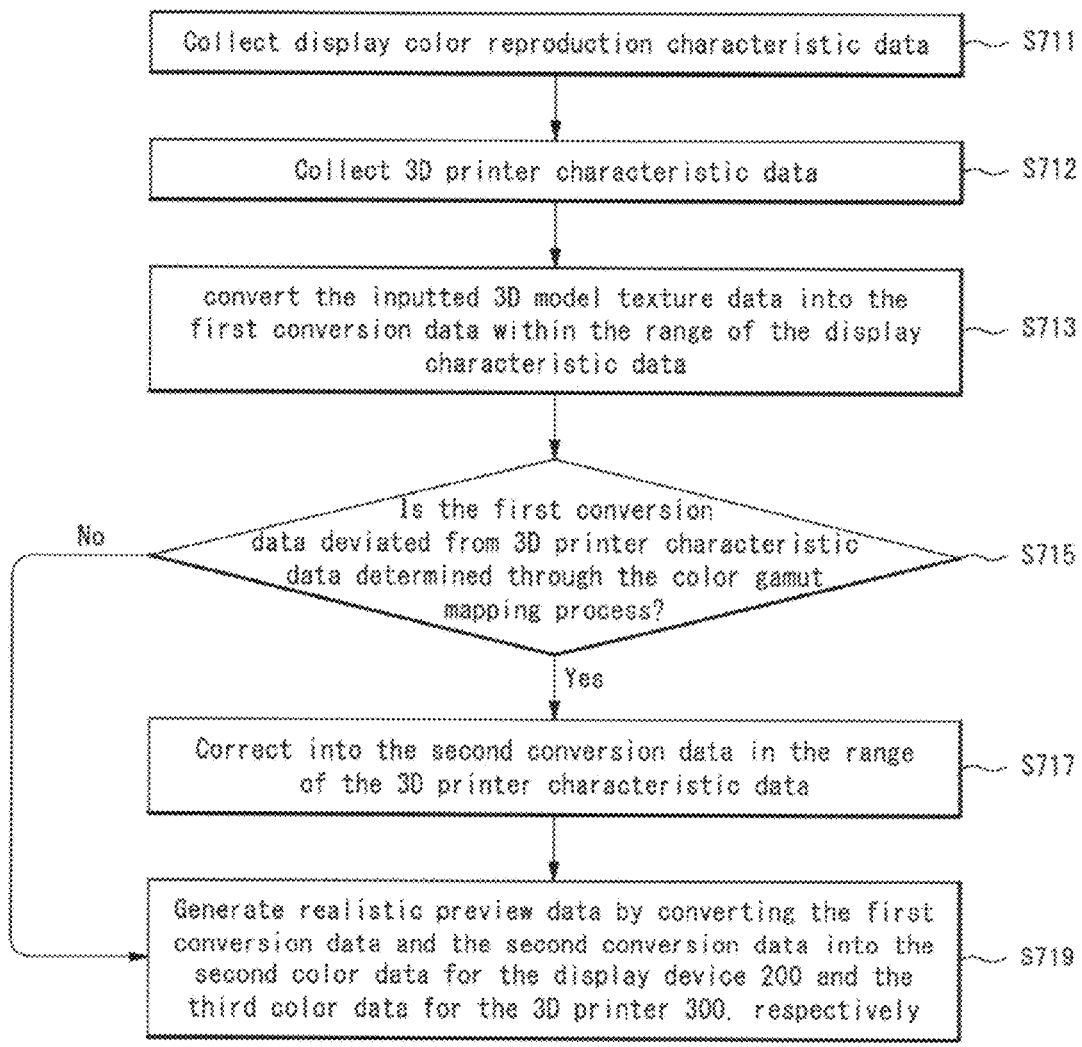

DEVICE AND METHOD FOR SIMULATING 3D PRINTING

CROSS REFERENCE TO RELATED APPLICATION

This application claims the benefit of Korean Patent Application No. 10-2015-0036976, filed on Mar. 17, 2015, entitled "Device and method for simulating 3D printing", which is hereby incorporated by reference in its entirety into this application.

BACKGROUND OF THE INVENTION

1. Technical Field

The present invention relates to a device and a method for simulating 3D printing and more particularly, to a simulation technology which is able for a producer to predict and correct a 3D model through previews shown when the 3D model displayed in a monitor is outputted by a 3D printer.

2. Description of the Related Art 3D printing technology is emerging as a promising technology in a diverse group of industries. A 3D printer is a device to make a three-dimensional object by laying down successive layers of material such as polymer or metal of liquid or powder types.

Economic impacts of 3D printing are expected to change consumption patterns, revitalize entrepreneurship, generate new products and services, increase productivity and the like.

On the other hand, the 3D printing requires a long period of times and use of expensive materials to make 3D objects and has low color reproduction to reproduce colors as they are shown in a monitor which has high color reproduction.

KR Patent Publication No. 2008-0082909 (2008.09.12) discloses a 3D printer.

SUMMARY OF THE INVENTION

An object of the present invention is to provide a device and a method for simulating 3D printing which is able to correct and make up colors to be printed in real time by comparing with colors which a producer or a user desires so that it reduces a process for correcting and printing 3D objects.

It is to be appreciated that objects of the present invention are not limited by the object described above and other objects will become more apparent by describing in detail exemplary embodiments thereof below.

According to an aspect of the present invention, there is provided a device for simulating 3D printing.

A device for simulating 3D printing according to an embodiment of the present invention may comprise: a 3D model texture data input unit configured to input 3D model texture data of an object to be outputted through a 3D printer; a realistic preview data generating unit configured to generate realistic preview data by converting the 3D model texture data; a rendering image generating unit configured to generate a first rendering image based on the 3D model texture data and a second rendering image based on the realistic preview data; and an output control unit configured to control the 3D printer to output the second rendering image through the 3D printer.

According to another aspect of the present invention, there is provided a method for simulating 3D printing.

A method for simulating 3D printing according to an embodiment of the present invention may comprise: inputting 3D model texture data of an object to be outputted through a 3D printer; generating realistic preview data by converting the 3D model texture data; generating a first rendering image based on the 3D model texture data and a second rendering image based on the realistic preview data; and controlling the 3D printer to output the second rendering image though the 3D printer.

The present allows for a user to correct or make up colors to be printed through 3D printing simulation in real time.

The present invention further allows to reduce cost and time associated with a 3D printer for obtaining quality 3D printouts by reducing repeated correction and printing processes.

The present invention further allows contents creation optimized to a 3D printer and improvement of qualities since when a color which is selected by a user is printed, contents can be created by checking how it looks.

BRIEF DESCRIPTION OF DRAWINGS

FIG. 2 to FIG. 6 are drawings to explain a device for simulating 3D printing according to an embodiment of the present invention.

FIG. 7 and FIG. 8 are drawings to explain a method for simulating 3D printing according to an embodiment of the present invention.

DESCRIPTION OF THE EXEMPLARY EMBODIMENTS

The present invention will be described with reference to particular embodiments. However, it is to be appreciated that various changes and modifications may be made by those skilled in the art without departing from the spirit and scope of the present invention. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, exemplary embodiments of the present invention will be described with reference to the accompanying drawings.

Figure 1:
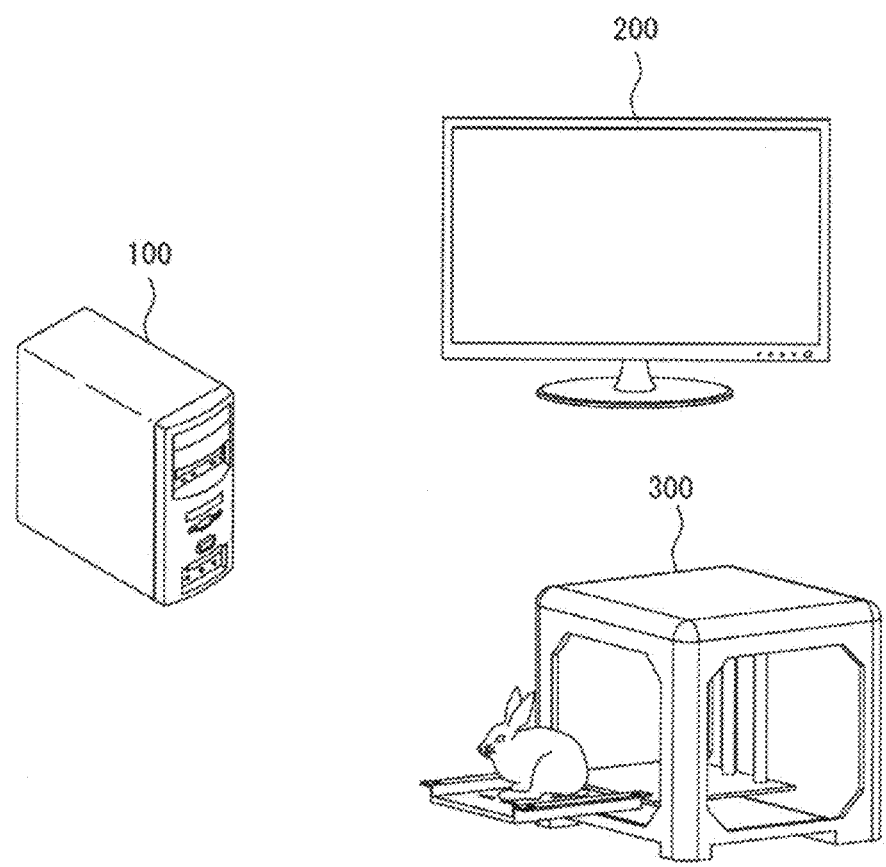
FIG. 1 illustrates a system for simulating 3D printing according to an embodiment of the present invention.

FIG. 1 illustrates a system for simulating 3D printing according to an embodiment of the present invention.

Referring to FIG. 1, a system for simulating 3D printing may comprise a device for simulating 3D printing 100, a display device 200 and a 3D printer 300.

The device for simulating 3D printing 100 may generate realistic preview data by converting 3D model texture data of an inputted object. Here, the realistic preview data may be generated by being corrected or converted within color gamut of display characteristic data of the display device 200 and 3D printer characteristic data of the 3D printer 300.

The device for simulating 3D printing 100 may display a rendering image to be printed by 3D printer 300 in real time based on the generated realistic preview data, and color correction of the object to be printed by 3D printer 300 may be made by the user in real time. The device for simulating 3D printing 100 may correct and make up the color of the object by checking in real time through 3D printing simulation. Since when the color which a user selects is outputted, the user may produce contents by checking how the color looks, the device for simulating 3D printing 100 allows production of contents optimized to the 3D printer and improvement of qualities as well.

The display device 200 may transmit display characteristic data to the device for simulating 3D printing 100 and display a first rendering image generated based on the 3D model texture data and a second rendering image generated based on the realistic preview data. The display device 200 may also display color gamut mapping data representing color gamut, which both the display device 200 and the 3D printer 300 are able to represent, in addition to the first rendering image and the second rendering image.

The 3D printer 300 may transmit 3D printer characteristic data to the device for simulating 3D printing 100 and output the object of the second rendering image displayed through the display device 200.

FIG. 2 to FIG. 6 are drawings to explain a device for simulating 3D printing according to an embodiment of the present invention.

Figure 2:
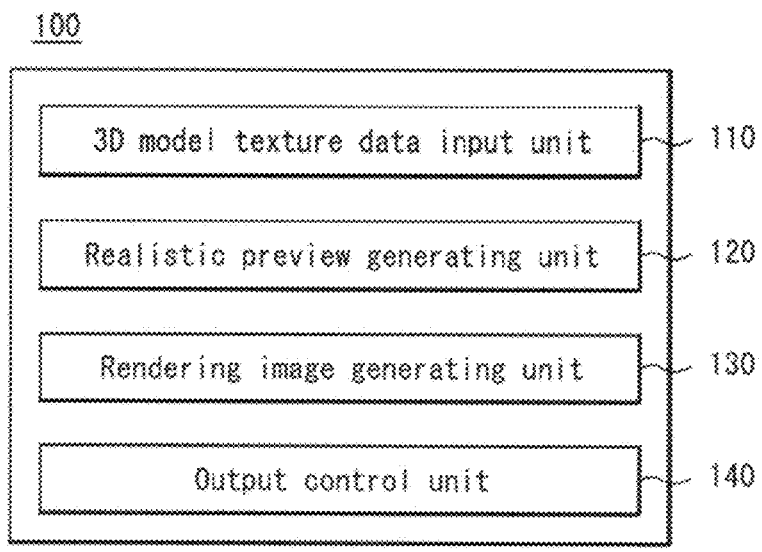

Referring to FIG. 2, a device for simulating 3D printing 100 may comprise a 3D model texture data input unit 110, a realistic preview generating unit 120, a rendering image generating unit 130 and an output control unit 140.

The 3D model texture data input unit 110 may input 3D model texture data of an object (3D model) to be printed through the 3D printer. Here, the 3D model texture data may include color information of appearance of the 3D model.

The realistic preview generating unit 120 may generate realistic preview data by converting the inputted 3D model texture data.

The realistic preview generating unit 120 may convert the 3D model texture data into a 3D output image to simulate, in advance, colors printed based on the inputted 3D model texture data.

The realistic preview generating unit 120 may collect display characteristic data of the display device 200 connected thereto and 3D printer characteristic data of the 3D printer 300 connected thereto.

The realistic preview generating unit 120 may convert the first color data (the first RGB data) of the inputted 3D model texture data into the first conversion data (the first CIE LAB or CIE XYZ data) within the range of the collected 3D printer characteristic data. The realistic preview generating unit 120 may then generate realistic preview data of the second color data (the second RGB data) for the display device 200 and the third color data (the third RGB data) for the 3D printer 300.

When the first color data of the 3D model texture data deviates the range of the 3D printer characteristic data, the realistic preview generating unit 120 may correct it to the second conversion data to be within the range of the 3D printer characteristic data to generate the corresponding realistic preview data. Since display color representation range is far wider than color representation range of the 3D printer, display color which a user desires may not be represented with the 3D printer.

The realistic preview generating unit 120 may map color gamut using the display color reproduction characteristic data and the 3D printer characteristic data. When color gamut of the 3D model texture data is not located in the mapped color gamut, the realistic preview generating unit 120 may correct color data to generate realistic preview data. This will be explained in more detail with reference to FIG. 3.

The rendering image generating unit 130 may generate a first rendering image based on the inputted 3D model texture data and a second rendering image based on the generated realistic preview data.

The rendering image generating unit 130 may correct colors of the second rendering image by referring to the first rendering image and the second rendering image. This will be explained in more detail with reference to FIG. 5.

The output, control unit 140 may output the generated rendering image to the display device 200 and the 3D printer. The output control unit 140 may control the 3D printer 300 to output the second rendering image within the range of the 3D printer characteristic data.

Figure 3:
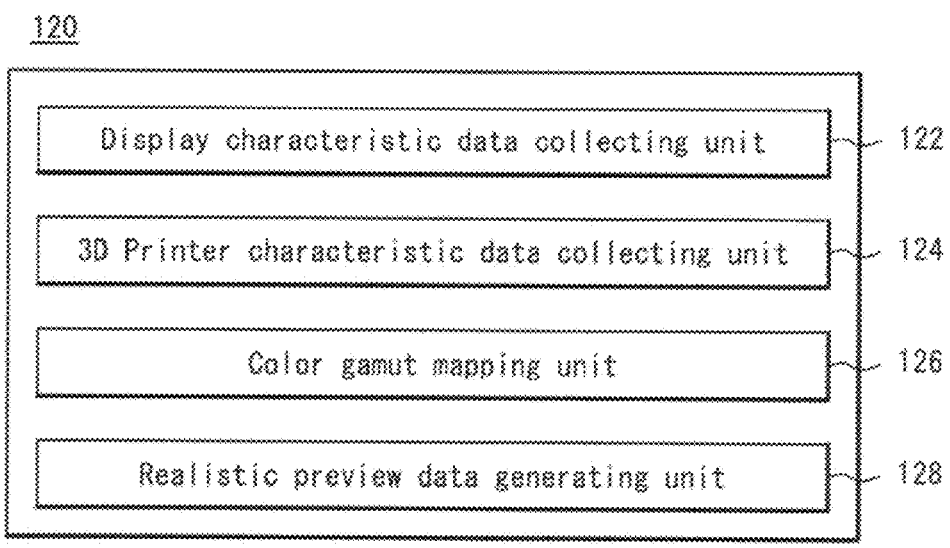

Referring to FIG. 3, the realistic preview generating unit 120 may comprise a display characteristic data collecting unit 122, a 3D printer characteristic data collecting unit 124, a color gamut mapping unit 126 and a realistic preview data generating unit 128.

The display characteristic data collecting unit 122 may collect display characteristic data of the display device 200 which is connected to the device for simulating 3D printing 120. Here, the display characteristic data may include color reproduction characteristic data of the display device 200.

The 3D printer characteristic data collecting unit 124 may collect 3D printer characteristic data of the 3D printer 300 which is connected to the device for simulating 3D printing 120. Here, the 3D printer characteristic data may include at least one of 3D printer output color characteristic data, 3D printer material data and 3D printer ink data.

The color gamut mapping unit 126 may generate color gamut mapping data which defines color gamut which both the display device 200 and the 3D printer 300 are able to represent.

Figure 4:
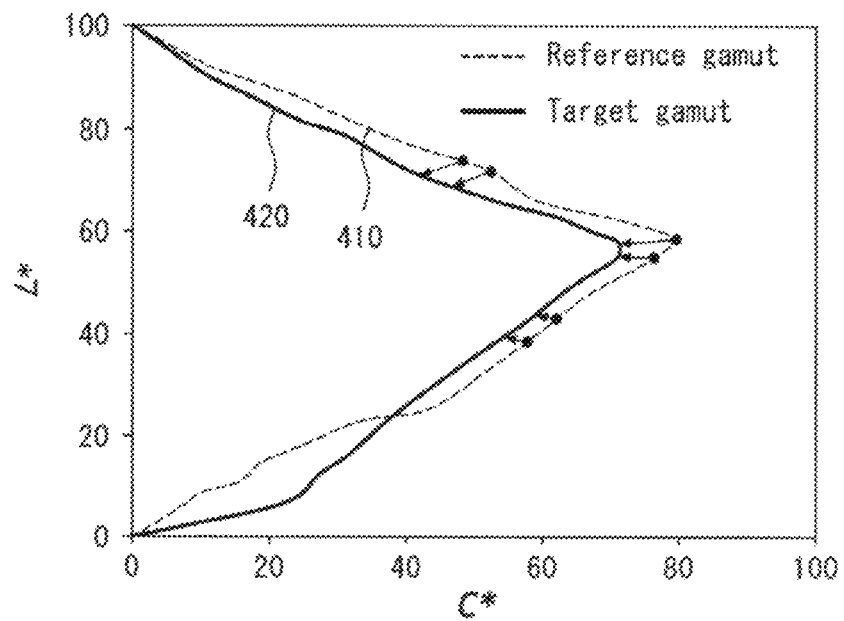

Referring to FIG. 4, the color gamut mapping unit 126 may represent volume of the color gamut which the display device 200 and the 3D printer 300 can represent in 3D space (CIE LAB color space) and compare color difference between them. The color gamut mapping unit 126 may then generate color gamut mapping data by mapping colors which are off the target gamut 420 in the 3D printer 300 among colors within the reference gamut 410 in the display device 200 to be within the reference gamut in the display device 200. Here, mapping may be divided into a cutting algorithm and a compression algorithm. In the cutting algorithm, colors in the common region may be maintained as they are and the colors off the color gamut of the 3D printer may be mapped to edge. In the compression algorithm, all color data may be corrected by pushing the entire color gamut of the display device to the color gamut of the 3D printer.

The realistic preview data generating unit 128 may generate realistic preview data within the color gamut where the color gamut of the 3D model texture data is mapped.

The realistic preview data generating unit 128 may further comprise an alternative color recommending unit configured to report to a user by displaying a particular color which is not represented in the 3D printer 300 and recommend an alternative color therefor.

The realistic preview data generating unit 140 may convert the first color data of the 3D model texture data into the first conversion data to output the displayed color in a similar color. Here, the display color reproduction characteristics may estimate color data to be outputted for the first color data which is inputted by estimating conversion relationship of the first conversion data (CIEXYZ or CIELAB) of the output display for the first color data inputted in the display device 200. As shown in the following Equation 1 (Here, X, Y and Z are the first conversion data, R, G and B are the first color data), the color data may be estimated through function f which coverts RGB color input data to output data and an inverse function for its inverse conversion.

$$\begin{bmatrix} X \\ Y \\ Z \end{bmatrix} = f\left(\begin{bmatrix} R \\ G \\ B \end{bmatrix}\right) \quad \text{Equation 1}$$

The realistic preview data generating unit 140 may correct the first conversion data (first CIE LAB data) into the second conversion data (the second LAB data) as the color data within the range which the 3D printer is able to reproduce through a mapping process from the display device 200 to the 3D printer 300. The realistic preview data generating unit 140 may then convert the second conversion data (the second LAB data) into the second color data (the second RGB data) corresponding the display device 200 and output the result. Or the realistic preview data generating unit 140 may then convert into the third color data (the third RGB data) corresponding to the display device 200 and display the result. Here, since the 3D printer 300 shows various color reproduction characteristics depending on materials used unlike the display device 200, it may be applied differently according to printing materials and ink.

$$\begin{bmatrix} X \\ Y \\ Z \end{bmatrix} = g_1\left(\begin{bmatrix} R \\ G \\ B \end{bmatrix}\right), \quad \text{Equation 2}$$

$$\begin{bmatrix} X \\ Y \\ Z \end{bmatrix} = g_2\left(\begin{bmatrix} R \\ G \\ B \end{bmatrix}\right), \quad \text{Equation 3}$$

$$\begin{bmatrix} X \\ Y \\ Z \end{bmatrix} = g_3\left(\begin{bmatrix} R \\ G \\ B \end{bmatrix}\right). \quad \text{Equation 4}$$

For example, when 3 materials are used, the realistic preview data generating unit 140 may generate RGB data corresponding to the 3D printer 300 through inverse functions ($g_1^{-1}$, $g_2^{-1}$, $g_3^{-1}$) of the conversion equation for each material using conversion relationship (Here, X, Y and Z are the first conversion data, R, G and B are the third conversion data) of Equation 2 to Equation 4.

Figure 5:
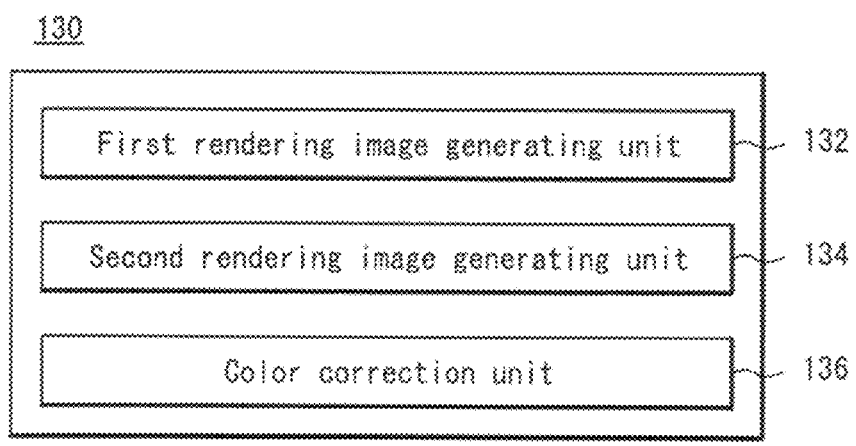

Referring to FIG. 5, the rendering image generating unit 130 may include a first rendering image generating unit 132, a second rendering image generating unit 134 and a color correction unit 136.

The first rendering image generating unit 132 may generate a first rendering image to be displayed in the display device 200 based on inputted 3D model texture data.

The second rendering image generating unit 134 may generate a second rendering image to be outputted in the 3D printer 300 based on the generated realistic preview data.

The color correction unit 136 may correct the second rendering image to be outputted in the 3D printer 300 by referring to the first rendering image outputted through the display device 200 and the second rendering image.

Referring to FIG. 6, the color correction unit 136 may correct colors of the second rendering image within the color gamut mapping data by referring to the first rendering image 610 outputted in the display device 200, the second rendering image 620 to be outputted in the 3D printer 300, and the color gamut mapping data 630 representing the color gamut which both the display device 200 and the 3D printer 300 are able to represent.

The color correction unit 136 may correct the first rendering image along with the correction of the second rendering image. The color correction unit 136 may correct colors immediately by checking an image to be outputted in the 3D printer 300 though simulation. This can make up and correct colors of contents in real time through checking by a user. This can further reduce cost and time associated with the 3D printer. This can still further allow optimal production of contents and improvement on quality of contents since the contents can be produced by checking how they look when colors selected by a user are outputted.

FIG. 7 and FIG. 8 are drawings to explain a method for simulating 3D printing according to an embodiment of the present invention.

Referring to FIG. 7, in S705, the device for simulating 3D printing 100 may receive 3D model texture data of an object to be outputted through the 3D printer 300.

In S710, the device for simulating 3D printing 100 may generate realistic preview data by converting the inputted 3D model texture data. This will be explained in more detail with reference to FIG. 8.

In S715, the device for simulating 3D printing 100 may generate a first rendering image based on the inputted 3D model texture data and a second rendering image based on the generated realistic preview data.

In S720, the device for simulating 3D printing 100 may determine whether a correction command for the second rendering image is inputted or not.

In S725, when the correction command is inputted, the device for simulating 3D printing 100 may determine what color gamut, which both the display device 200 and the 3D printer 300 are able to represent, is.

In S730, the device for simulating 3D printing 100 may correct the second rendering image when it is determined as that the color gamut is within the color gamut which both the display device 200 and the 3D printer 300 are able to represent.

In S735, the device for simulating 3D printing 100 may output the second rendering image to the 3D printer 300.

Referring to FIG. 8, in S711, the device for simulating 3D printing 100 may collect display characteristic data of the display device 200 connected thereto.

In S712, the device for simulating 3D printing 100 may collect 3D printer characteristic data of the 3D printer 300 connected thereto.

In S713, the device for simulating 3D printing 100 may convert the inputted 3D model texture data (the first RGB color data) into the first conversion data (the first CIE XYZ or CIE LAB color data) within the range of the display characteristic data.

In S715, the device for simulating 3D printing 100 may determine whether the first conversion data is deviated from the range in which the 3D printer 300 is able to reproduce or not through the color gamut mapping process using the display characteristic data and the 3D printer characteristic data.

In S717, when it is determined as that the first conversion data is deviated from the range in which the 3D printer 300 is able to reproduce, the device for simulating 3D printing 100 may correct the first conversion data into the second conversion data (the second CIE XYZ or CIE LAB color data) in the range of the 3D printer characteristic data. Since the display color representation range is far wider than the color representation range, a user cannot represent colors of the display device 200 with the 3D printer 300.

In S719, the device for simulating 3D printing 100 may generate realistic preview data by converting the first conversion data and the second conversion data into the second color data (the second RGB data) for the display device 200 and the third color data (the third RGB data) for the 3D printer 300, respectively.

A method for simulating 3D printing according to the exemplary embodiment of the present invention can be implemented by the method which the computer is implemented or in non-volatile computer recording media stored in computer executable instructions. The instructions can perform the method according to at least one embodiment of the present invention when they are executed by a processor. The computer readable medium may include a program instruction, a data file and a data structure or a combination of one or more of these.

The program instruction recorded in the computer readable medium may be specially designed for the present invention or generally known in the art to be available for use. Examples of the computer readable recording medium include a hardware device constructed to store and execute a program instruction, for example, magnetic media such as hard disks, floppy disks, and magnetic tapes, optical media such as CD-ROMs, and DVDs, and magneto-optical media such as floptical disks, read-only memories (ROMs), random access memories (RAMS), and flash memories.

While it has been described with reference to particular embodiments, it is to be appreciated that various changes and modifications may be made by those skilled in the art without departing from the spirit and scope of the embodiment herein, as defined by the appended claims and their equivalents. Accordingly, examples described herein are only for explanation and there is no intention to limit the invention. The scope of the present invention should be interpreted by the following claims and it should be interpreted that all spirits equivalent to the following claims fall with the scope of the present invention.

What is claimed is:

1. A device for simulating 3D printing, comprising:
one or more processors that process computer executable program code embodied in non-transitory computer readable storage media, the computer executable program code comprising:
a 3D model texture data input program code that receives 3D model texture data of an object to be outputted through a 3D printer;
a realistic preview data generating program code that generates realistic preview data by converting the 3D model texture data into color gamut mapping data based on display characteristic data of a connected display device and 3D printer characteristic data of the 3D printer;
a rendering image generating program code that generates a first rendering image based on the 3D model texture data and a second rendering image based on the realistic preview data; and
an output control program code that controls the 3D printer to output the second rendering image through the 3D printer.

2. The device of claim 1, wherein the realistic preview data generating program code comprises:
a display characteristic data collecting program code that collects the display characteristic data of the connected display device;
a 3D printer characteristic data collecting program code that collects the 3D printer characteristic data of the 3D printer;
a color gamut mapping program code that generates color gamut mapping data which defines all color gamut which the display device and the 3D printer represent by using the display characteristic data and the 3D printer characteristic data; and
a preview data generating program code that generates realistic preview data by converting or correcting the 3D model texture data into the color gamut mapping data.

3. The device of claim 2, wherein the realistic preview data generating program code further comprises an alternative color recommending program code that displays a particular color which is not represented in the 3D printer and recommend an alternative color.

4. The device of claim 2, wherein the color gamut mapping program code corrects a color in color gamut which is represented in the display device but not represented in the 3D printer into a corresponding color by mapping with the border of a color in the common region of the display device and the 3D printer or by mapping the entire color gamut of the display device with color gamut of the 3D printer.

5. The device of claim 1, wherein the display characteristic data comprises color reproduction characteristic data of the display device.

6. The device of claim 1, wherein the 3D printer characteristic data comprises at least one of output color characteristic data, material data and ink data of the 3D printer.

7. The device of claim 1, wherein the rendering image generating program code comprises:
a first rendering image generating program code that generates a first rendering image based on the 3D model texture data;
a second rendering image generating program code that generates a second rendering image based on the realistic preview data; and
a color correction program code that corrects the second rendering image by referring to the first rendering image and the second rendering image.

8. The device of claim 7, wherein the color correction program code displays color gamut mapping data which defines color gamut which both the display device 200 and the 3D printer represent by using the display characteristic data and the 3D printer characteristic data.

9. A method for simulating 3D printing, comprising:
inputting 3D model texture data of, an object to be outputted through a 3D printer;
generating realistic preview data by converting the 3D model texture data into color gamut mapping data based on display characteristic data of a connected display device and 3D printer characteristic data of the 3D printer;
generating a first rendering image based on the 3D model texture data and a second rendering image based on the realistic preview data; and
controlling the 3D printer to output the second rendering image though the 3D printer.

10. The method of claim 9, wherein the step for generating realistic preview data by converting the 3D model texture data comprises:
collecting the display characteristic data of the connected display device;
collecting the 3D printer characteristic data of the 3D printer;

generating color gamut mapping data of color gamut which both the display device and the 3D printer are able to represent by using the display characteristic data and the 3D printer characteristic data; and generating realistic preview data by converting or correcting the 3D model texture data within the range of the color gamut mapping data.

11. The method of claim 10, wherein the step for generating realistic preview data by converting or correcting the 3D model texture data further comprises displaying a particular color which is not represented in the 3D printer and recommending an alternative color.

12. The method of claim 10, wherein the step for generating, the color gamut mapping data comprises correcting a color in color gamut which is represented in the display device but not represented in the 3D printer into a corresponding color by mapping with the border of a color in the common region of the display device and the 3D printer or by mapping the entire color gamut of the display device with color gamut of the 3D printer.

13. The method of claim 9, wherein the display characteristic data comprises color reproduction characteristic data of the display device.

14. The method of claim 9, wherein the 3D printer characteristic data comprises at least one of output color characteristic data, material data and ink data of the 3D printer.

15. The method of claim 9, wherein the step for generating a first rendering image based on the 3D model texture data and a second rendering image based on the realistic preview data comprises:

generating the first rendering image based on the 3D model texture data;

generating the second rendering image based on the realistic preview data; and correcting the second rendering image by referring to the first rendering image and the second rendering image.

16. The method of claim 15, wherein the step for correcting the second rendering image by referring to the first rendering image and the second rendering image comprises displaying color gamut mapping data, which the display device and the 3D printer are able to represent, by using the display characteristic data and the 3D printer characteristic data.

* * * * *